United States Patent [19]

Isa et al.

[11] 3,997,623

[45] Dec. 14, 1976

[54] METHOD FOR PREPARATION OF LIQUID OLEFIN POLYMERS

[75] Inventors: Hiroshi Isa; Toshiyuki Ukigai, both of Yachiyo; Anri Tominaga, Tokyo; Michito Sato, Yokohama, all of Japan

[73] Assignee: Lion Fat & Oil Co., Ltd., Tokyo, Japan

[22] Filed: Nov. 21, 1975

[21] Appl. No.: 634,074

[30] Foreign Application Priority Data

Dec. 3, 1974 Japan ............................. 49-138702

[52] U.S. Cl. ...................................... 260/683.15 B
[51] Int. Cl.² ........................................... C07C 3/18
[58] Field of Search ........................... 260/683.15 B

[56] References Cited

UNITED STATES PATENTS 3,947,509  3/1976  Isa et al. .................. 260/683.15 B
3,952,071  4/1976  Isa et al. .................. 260/683.15 B

*Primary Examiner*—C. Davis
*Attorney, Agent, or Firm*—Woodhams, Blanchard and Flynn

[57] ABSTRACT

When an olefin having 6 or more carbon atoms is polymerized in the presence of a mixture of a polyhydric alcohol derivative and an aluminum halide, said derivative being obtained by replacing hydrogen atoms of all the hydroxyl groups of polyhydric alcohol either by acyl groups exclusively or by acyl groups and alkyl groups, both of said groups having 1 to 20 carbon atoms (in which mixture the amount of said aluminum halide is 1.1 to 2.8 moles per 1 ester bond of said polyhydric alcohol derivative), there can be obtained liquid olefin polymers having various mean molecular weights at a high yield.

6 Claims, No Drawings

METHOD FOR PREPARATION OF LIQUID OLEFIN POLYMERS

BACKGROUND OF THE INVENTION a. Field of the Invention

The present invention relates to a novel method of preparing liquid olefin polymers.

b. Description of the Prior Art

As a method for polymerization of olefins, the cationic polymerization method employing the Lewis acids such as aluminum chloride has been known for a long time. According to this method, however, the degree of polymerization becomes so high under the ordinary reaction conditions that there can be obtained only high molecular-weight liquid polymers. It is of course possible to obtain low molecular-weight polymers subject to elevating the temperature for polymerization, but in this case, there are generated great quantities of dimers of olefin as byproduct, which are disqualified for use as a lubricant or a cosmetic base. Also, the catalyst system of this method has the drawback that it is apt to give rise to the skeltal isomerization of olefins and renders only such liquid polymers as having a low viscosity index and being unsuitable for use as a lubricant.

There has been proposed a Japanese patent publication No. 3804/1969 a method of effecting polymerization of olefins in the presence of a liquid catalyst prepared by dissolving excess aluminum halide in a complex consisting of aluminum halide and ethyl acetate at the molar ratio of 1:1. However, inasmuch as said complex does not act as a catalyst, the effect of this method is no more than cationic polymerization employing the aluminum halide added in excess. Therefore, even by this method employing a complex, there can be obtained only a high molecular-weight polymer under the ordinary polymerization conditions, and it is infeasible to obtain liquid polymers having various mean molecular weights.

Nowadays, from the view point of overcoming these drawbacks in the prior art, the use of the so-called Ziegler catalyst consisting of an organic aluminum and titanium tetrachloride as a catalyst for polymerization of olefins has come into the limelight. The use of this catalyst alters the atomic ratio of aluminum to titanium, and the higher is said atomic ratio altered thereby, the higher becomes the molecular weight of the resulting polymers, whereas the lower is said atomic ratio, the lower becomes the molecular weight of the resulting polymers. That is, by altering this atomic ratio, it is possible to obtain polymers having various mean molecular weights.

As a matter of fact, however, just a minor alteration of the atomic ratio would bring on a remarkable alteration of the mean molecular weight of the resulting polymer and it is difficult to obtain liquid polymers having various mean molecular weights. Besides, this method is poor in reproducibility and is low in yield, so that it is unsuitable for practical use.

SUMMARY OF THE INVENTION

The present invention is to provide a novel polymerization method to take the place of the above described polymerization methods in the prior art, and the object of the present invention is to obtain liquid polymers having various mean molecular weights at a high yield by merely altering the composition of the catalyst for use therein within a specific range.

The method of preparing liquid olefin polymers according to the present invention comprises polymerizing olefins having 6 or more carbon atoms in the presence of a mixture consisting of a specific polyhydric alcohol derivative selected from esters of polyhydric alcohol and an aluminum halide at a specific mixing ratio.

DETAILED DESCRIPTION OF THE INVENTION

The starting material olefin for use in the present invention is an $\alpha$-olefin or an internal olefin having 6 or more carbon atoms, and to be precise, hexene-1, octene-1, 2-ethyl octene-1, tridecene-3, octadecene-2, etc. are illustrative of the useful olefins, preferably an $\alpha$-olefin having carbon atoms in the range of from 6 to 16. Mixtures of these olefins can be used as the starting olefin as well. Further, as the starting olefin, those olefins which are prepared by the wax cracking method and the Ziegler method are also useful.

The polyhydric alcohol derivative used in the present polymerization method is an ester which can be regarded as has been derived from an alcohol having 2 or more hydroxyl groups in a molecule thereof. In other words, it is a derivative wherein the hydroxyl groups of polyhydric alcohol are ester bonds and are bonded either to acyl groups exclusively or to acyl groups and alkyl groups, both of said acyl group and alkyl group having 1 to 20 carbon atoms. The polyhydric alcohol used to obtain these polyhydric alcohol derivatives can be illustrated by ethylene glycol, glycerin, trimethylolpropane, neopentyl glycol, pentaerythritol, 1,2-propanediol, 1,5-pentanediol, 1,4-butanediol, 1,3-propanediol, diethylene glycol, triethylene glycol, tetraethylene glycol, etc., and the ester of such polyhydric alcohols can be illustrated by ethoxyethyl acetate, butoxypropyl acetate, methoxyethyl propionate, 4-methoxybutyl caproate, lauroxyethyl octanoate, ethylene glycol diacetate, ethylene glycol dicaproate, propylene glycol dipropionate, 1,3-diacetoxypropane, 1,4-diacetoxybutane, trans-1,4-diacetoxybutene-2, 1,5-diacetoxypentane, diethylene glycol diacetate, dibutylene glycol dipropionate, diethylene glycol didecanoate, pentaerythritol tetraacetate, neopentyl glycol diheptanoate, etc. The ester of polyhydric alcohol is preferably a member or a mixture of two or more members selected from the group consisting of ethoxyethyl acetate, butoxypropyl acetate, methoxyethoxyethyl propionate, ethylene glycol diacetate, 1,3-diacetoxypropane, 1,4-diacetoxybutane, trans-1,4-diacetoxybutene-2, diethylene glycol diacetate and diethylene glycol dipropionate.

To cite aluminum halides useful in the present invention, there are aluminum fluoride, aluminum chloride, aluminum bromide and aluminum iodide, of which aluminum chloride is particularly desirable.

In the polymerization method according to the present invention, the volume ratio of said polyhydric alcohol derivative to said aluminum halide constitutes an important factor, and by merely setting this volume ratio within a specific range, it is possible to obtain polymers of various mean molecular weights at a high yield. For instance, when the amount of aluminum halide is set to be 1.1 mole per 1 ester bond of said polyhydric alcohol derivative, there is obtained a polymer having a low molecular weight and a relatively low viscosity, whereas when it is set to be 2.0 moles per 1 ester bond of said derivative, the resulting liquid polymer is high in mean molecular weight and high in viscosity. However, any alteration of the amount of aluminum halide to be less than 1.1 mole or more than 2.8 moles would bring on no change in the mean molecular weight of the product polymer.

Therefore, the appropriate mixing ratio of the polyhydric alcohol derivative to the aluminum halide is in the range of from 1.1 to 2.8 moles, preferably from 1.1 to 2.5 moles, of aluminum halide per 1 ester bond of polyhydric alcohol derivative. And, the amount of the aluminum halide relative to the amount of the starting olefin is in the range of from 0.1 to 5 mol.%, preferably from 1.0 to 3.0 mol.%.

The reaction temperature varies with the kind of the polyhydric alcohol derivative as well as aluminum halide employed, but it is generally in the range of from 50° to 150° C.

As to the method of effecting the reaction, it is customary to dissolve the aluminum halide in the polyhydric alcohol derivative and then add the starting olefin to the resulting solution thereby to effect polymerization, but is also will do to prepare a catalyst in advance by mixing the polyhydric alcohol derivative with the aluminum halide in an inert solvent, such as n-octane, olefin oligomer, etc., and then add said catalyst to the starting olefin.

Although this polymerization is usually effected in the absence of solvent, a solvent may be used for the purpose of facilitating the control of the reaction temperature. The solvent for this purpose can be illustrated by n-pentane, isooctane, trichloroethane, tetrafluoroethane, etc. The appropriate amount of the solvent for use in this case is in the range of from 2 to ¼ times as much as the starting olefin (by volume). If it is desired to remove the unreacted olefin and/or olefin dimers from the polymerization product obtained by the method of the present invention, this object can be achieved by the distillation method or the extraction method. Further, if a hydrogenation treatment is required for the purpose of improving the oxidation stability and heat stability of the product polymer, it can be effected by the use of a hydrogenation catalyst such as Raney nickel, kieselguhr nickel, etc.

According to the above described polymerization method, it is possible to obtain liquid olefin polymers having various mean molecular weights at a high yield.

According to the method of the present invention, it is possible to obtain polymers having various mean molecular weight at a high yield by merely altering the composition of the catalyst consisting of a polyhydric alcohol derivative and an aluminum halide within a specific range, and said polymers have a high viscosity index and a low pour point and are superior in acid stability, so that they can be used as a base for high-grade lubricant, a cosmetic base or a fiber-treating agent depending on the range of opposite uses thereof. For instance, as a gas turbine oil and a hyraulic fluid for aircraft, polymers having a low viscosity are employed; as a hydraulic fluid for general machines and an ice-machine oil, polymers having medium viscosity are employed; and as grease and gear oil, polymers having a high viscosity are employed.

At present, the reaction mechanism of these catalysts in the olefin polymerization is yet to be clarified. However, it is generally believed that, when a compound comprising such polar groups as alcohol, ketone, acid, ester and the like is added to a cationic polymerization system, the molecular weight of the product polymer decreases.

When polymerization of olefins was effected by altering the volume ratio of ethyl acetate to aluminum chloride as taught in Japanese patent publication No. 3804/1969 and applying the same conditions as that for polymerization by the use of catalysts according to the present invention, the yield was remarkably low and there was not observed too much change in the molecular weight. In the catalyst system according to the present invention, liquid polymers having various mean molecular weights can be obtained at a high yield by altering the mixing ratio of the polyhydric alcohol derivative and the aluminum halide within a specified range, so it is likely that, in the case of the ethyl acetate-aluminum chloride catalyst system, at the time of the cationic polymerization employing excess aluminum chloride dissolved in ethyl acetate, said ethyl acetate merely gives rise to transfer reaction or cessation reaction with growing chains. On the contrary, in the case of the catalyst system of the present invention, it is likely that the polyhydric alcohol derivative does not function as a chain transfer agent or a polymerization stopper, but it forms a complex together with the aluminum halide and the thus formed complex per se has a specific polymerization effect.

PREFERRED EMBODIMENTS OF THE INVENTION

COMPARATIVE EXAMPLE 1

Upon putting 4.7 g of ethyl acetate in a 1 l glass autoclave with stirrer, 12 g of aluminum chloride were dissolved therein. On this occasion, the amount of aluminum chloride was maintained to be 1.68 mol.% of ethyl acetate. After elevating the temperature of the thus solution, polymerization was effected for 5 hours by slowly dropping therein 600 g of octene-1. After completing the reaction, ammonia gas was blown into the polymerization product thereby to inactivate the catalyst, and the separated catalyst was removed by filtration. Thereafter, the polymerization product was subjected to distillation so as to remove the unreacted olefin and olefin dimer, whereby a product polymer was obtained at the yield of 73%. The kinematic viscosity of this polymer at 100° F was 37 centistrokes.

COMPARATIVE EXAMPLE 2

Excepting that the amount of ethyl acetate employed was increased to 6.0 g and the amount of aluminum chloride employed was maintained to be 1.32 mol.% of ethyl acetate, by effecting polymerization under the same conditions as in Comparative Example 1, a polymer of octene-1 was obtained. The yield of this polymer was 3%.

EXAMPLE 1

After putting 12 g of aluminum chloride together with a prescribed amount of ethylene glycol diacetate at the ratios shown in the following Table-1 in a 1 l glass autoclave with stirrer and elevating the temperature of the stock up to 100° C, polymerization was effected for 5 hours while slowly adding 600 g of octene-1 thereto by dropping. After completing the reaction, ammonia gas was blown into the polymerization product thereby to inactivate the catalyst and the thus separated catalyst was removed by filtration. Thereafter, the respective polymerization product was subjected to distillation thereby to remove the unreacted olefin and olefin dimer therefrom, whereby a product polymer was obtained respectively. Then, by hydrogenating the respective polymer for 3 hours at a temperature of 150° C under a hydrogen pressure of 10 Kg/cm² in the presence of 20 g of Raney nickel catalyst, a variety of hydrogenated oils were obtained. In Table-1 are shown the amount of ethylene glycol diacetate employed, the molar ratio of aluminum chloride per 1 ester bond of ethylene glycol diacetate, the yield of polymer, the kinematic viscosity of these hydrogenated oils at 100° F, the viscosity index and the mean molecular weights thereof.

num chloride in a 0.1 l glass autoclave with stirrer, 1,4-diacetoxybutane in the respective amount shown in the following Table-3 was slowly dropped into the stock, whereby a variety of catalysts were prepared. After putting the respective catalyst in a 1 l autoclave and elevating the temperature up to 120° C, polymerization was effected for 5 hours while adding thereto 600 g of decene-1 by slowly dropping. After completing the reaction, the reaction product was treated under the same conditions as in Example 1, whereby a variety of hydrogenated oils were obtained. In Table-3 are shown Table-1

| Experiment No. | Ethylene glycol diacetate (g) | Molar ratio of aluminum chloride | Yield of polymer (%) | Kinematic viscosity at 100° F (cst) | Viscosity index | Mean Molecular weight |
|---|---|---|---|---|---|---|
| 1 | 6.1 | 1.10 | 93 | 35.4 | 128 | 500 |
| 2 | 4.8 | 1.35 | 95 | 65.2 | 128 | 650 |
| 3 | 3.3 | 2.00 | 96 | 101.9 | 127 | 720 |
| 4 | 2.7 | 2.45 | 96 | 133.5 | 127 | 800 |

EXAMPLE 2

Excepting that ethoxyethyl acetate was employed in the respective amount shown in the following Table-2 in place of ethylene glycol diacetate and the ratio of said ethoxyethyl acetate to aluminum chloride by volume was altered as shown in the same table, by effecting polymerization under the same conditions as in Example 1, a polymer of octene-1 was obtained respectively. Further, the thus obtained polymers were subjected to hydrogenation under the same conditions as in Example 1 thereby to obtain a variety of hydrogenated oils. In Table-2 are shown the amount of ethoxyethyl acetate employed, the molar ratio of aluminum chloride per 1 ester bond or ether bond of ethoxyethyl acetate, the yield of polymer, the kinematic viscosity of these hydrogenated oils at 100° F, the viscosity index and the mean molecular weight thereof.

the amount of 1,4-diacetoxybutane employed, the molar ratio of aluminum chloride per 1 ester bond of 1,4-diacetoxybutane the yield of polymer, the kinematic viscosity of these hydrogenated oils at 100° F, the viscosity index and the mean molecular weight thereof.

Table-3

| Experiment No. | 1,4-diacetoxy-butane (g) | Molar ratio of aluminum chloride | Yield of polymer (%) | Kinematic viscosity at 100° F (cst) | Viscosity index | Mean molecular weight |
|---|---|---|---|---|---|---|
| 9 | 7.1 | 1.10 | 85 | 30.7 | 138 | 470 |
| 10 | 5.2 | 1.50 | 89 | 41.5 | 138 | 530 |
| 11 | 4.5 | 1.74 | 92 | 65.2 | 137 | 650 |
| 12 | 3.6 | 2.18 | 95 | 90.0 | 137 | 730 |

EXAMPLE 4

Excepting that butoxypropyl acetate was employed in the respective amount shown in the following Table-4 in place of ethylene glycol diacetate, the ratio of said butoxypropyl acetate to aluminum chloride by volume was altered as shown in the same table, a mixture consisting of tetradecene-1 and dodecene-1 at the ratio of 1:1 (molar ratio) was employed as olefin, and the reaction temperature and the time for reaction were set at 130° C and 5 hours, respectively, by effecting polymerization under the same conditions as in Example 1, a Table-2

| Experiment No. | Ethoxyethyl acetate (g) | Molar ratio of aluminum Chloride | Yield of polymer (%) | Kinematic viscosity at 100° F (cst) | Viscosity index | Mean Molecular Weight |
|---|---|---|---|---|---|---|
| 5 | 5.4 | 1.10 | 92 | 48.1 | 128 | 550 |
| 6 | 4.0 | 1.49 | 93 | 85.5 | 128 | 790 |
| 7 | 3.7 | 1.61 | 95 | 111.8 | 127 | 725 |
| 8 | 2.7 | 2.21 | 95 | 138.4 | 127 | 830 |

EXAMPLE 3

After stocking 40 g of the hydrogenated oil synthesized in Experiment No. 1 together with 12 g of alumivariety of polymers were obtained. The characteristics of these polymers were as shown in Table-4.

Table-4

| Experiment No. | butoxypropyl[a] acetate (g) | Molar ratio of aluminum chloride[b] (b/2a) | Yield of polymer (%) | Kinematic viscosity at 100° F (cst) | Viscosity index | Mean molecular weight |
| --- | --- | --- | --- | --- | --- | --- |
| 13 | 7.1 | 1.10 | 93 | 60.4 | 150 | 590 |
| 14 | 5.8 | 1.34 | 94 | 72.3 | 150 | 650 |
| 15 | 4.3 | 1.80 | 95 | 90.6 | 151 | 680 |
| 16 | 3.4 | 2.30 | 95 | 130.2 | 150 | 800 |

EXAMPLE 5

Excepting that 1,3-diacetoxypropane was employed as polyhydric alcohol derivative in the respective amount shown in the following Table-5, the ratio of said 1,3-diacetoxypropane to aluminum chloride by volume was altered as shown in the same table, a mixture consisting of hexene-1, octene-1 and decene-1 at the ratio of 1:1:1 (molar ratio) was employed as olefin, and the reaction temperature and the time for reaction were set at 130°C and 5 hours, respectively, by effecting polymerization under the same conditions as in Example 1, a variety of polymers were obtained. The characteristics of these polymers were as shown in Table-5.

EXAMPLE 7

Excepting that diethylene glycol diacetate was employed as polyhydric alcohol derivative in the respective amount shown in the following Table-7, the ratio of said diethylene glycol diacetate to aluminum chloride by volume was altered as shown in the same table, decene-1 was employed as olefin, and the reaction temperature and the time for reaction were set at 130° C and 5 hours, respectively, by effecting polymerization under the same conditions as in Example 1, a variety of polymers were obtained. The characteristics of these polymers were as shown in Table-7.

Table-5

| Experiment No. | 1,3-diacetoxy-[a] propane (g) | Molar ratio of aluminum chloride[b] (b/2a) | Yield of polymer (%) | Kinematic viscosity at 100°F (cst) | Viscosity index | Mean molecular weight |
| --- | --- | --- | --- | --- | --- | --- |
| 17 | 6.5 | 1.10 | 92 | 30.4 | 128 | 480 |
| 18 | 5.2 | 1.39 | 93 | 40.9 | 128 | 520 |
| 19 | 4.2 | 1.73 | 95 | 63.2 | 128 | 600 |
| 20 | 3.3 | 2.20 | 95 | 89.5 | 128 | 790 |

Table-7

| Experiment No. | Diethylene[a] glycol diacetate (g) | Molar ratio of aluminum chloride [b] (b/3a) | Yield of polymer (%) | Kinematic viscosity at 100° F (cst) | Viscosity index | Mean molecular weight |
| --- | --- | --- | --- | --- | --- | --- |
| 25 | 5.2 | 1.10 | 93 | 41.5 | 138 | 530 |
| 26 | 4.0 | 1.41 | 95 | 65.2 | 138 | 590 |
| 27 | 3.2 | 1.80 | 96 | 94.3 | 138 | 690 |
| 28 | 2.3 | 2.50 | 96 | 140.2 | 138 | 840 |

EXAMPLE 6

Excepting that trans-1,4-diacetoxybutene-2 was employed as polyhydric alcohol derivative in the respective amount shown in the following Table-6, the ratio of said trans-1,4-diacetoxybutene-2 to aluminum chloride by volume was altered as shown in the same table, hexadecene-1 was employed as olefin, and the reaction temperature and the time for reaction were set at 130°C and 5 hours, respectively, by effecting polymerization under the same conditions as in Example 1, a variety of polymers were obtained. The characteristics of these polymers were as shown in Table-6.

EXAMPLE 8

Excepting that diethylene glycol dipropionate was employed as polyhydric alcohol derivative in the respective amount shown in the following Table-8, the ratio of said diethylene glycol dispropionate to aluminum chloride by volume was altered as shown in the same table, octene-1 was employed as olefin, and the reaction temperature and the time for reaction were set at 130°C and 5 hours, respectively, by effecting polymerization under the same conditions as in Example 1, a variety of polymers were obtained. The characteristics of these polymers were as shown in Table-8.

Table-6

| Experiment No. | Trans-1,4-[a] diacetoxybutene -2 (g) | Molar ratio of aluminum chloride[b] (b/2a) | Yield of polymer (%) | Kinematic viscosity of 100° F (cst) | Viscosity index | Mean Molecular weight |
| --- | --- | --- | --- | --- | --- | --- |
| 21 | 7.0 | 1.10 | 93 | 81.6 | 154 | 760 |
| 22 | 5.4 | 1.43 | 94 | 130.1 | 156 | 800 |
| 23 | 4.6 | 1.69 | 96 | 160.4 | 156 | 830 |
| 24 | 3.7 | 2.10 | 96 | 205.2 | 156 | 870 |

Table-8

| Experiment No. | Diethylene[a] glycol dipropionate (g) | Molar ratio of aluminum chloride[b] (b/3a) | Yield of polymer (%) | Kinematic viscosity at 100° F (cst) | Viscosity index | Mean molecular weight |
| --- | --- | --- | --- | --- | --- | --- |
| 29 | 6.7 | 1.10 | 92 | 35.3 | 128 | 500 |
| 30 | 4.9 | 1.50 | 93 | 50.4 | 127 | 570 |
| 31 | 4.3 | 1.71 | 95 | 85.2 | 128 | 790 |
| 32 | 3.4 | 2.15 | 95 | 120.6 | 128 | 810 |

What is claimed is:

1. A method of preparing liquid olefin polymers by subjecting an olefin having six or more carbon atoms to low-polymerization, wherein said olefin is to be polymerized in the presence of a mixture composed of a polyhydric alcohol derivative and an aluminum halide, said derivative being obtained by replacing hydrogen atoms of all the hydroxyl groups of the polyhydric alcohol either by acyl groups exclusively or by acyl groups and alkyl groups, both of said groups having 1 to 20 carbon atoms (in which mixture the amount of said aluminum halide is in the range of from 1.1 to 2.8 moles per 1 ester bond of said polyhydric alcohol derivative).

2. A method according to claim 1, wherein said olefin is a member or a mixture of two or more members selected from the group consisting of α-olefins having 6 to 16 carbon atoms.

3. A method according to claim 1, wherein said polyhydric alcohol derivative is a member or a mixture of two or more members selected from the group consisting of ethoxyethyl acetate, butoxypropyl acetate, methoxyethoxyethyl propionate, ethylene glycol diacetate, 1,3-diacetoxypropane, 1,4-diacetoxybutane, trans-1,4-diacetoxybutene-2, diethylene glycol diacetate and diethylene glycol dipropionate.

4. A method according to claim 1, wherein said aluminum halide is dissolved in said polyhydric alcohol derivative and then a starting olefin is added to the resulting solution thereby to effect polymerization.

5. A method according to claim 1, wherein said polyhydric alcohol derivative and aluminum halide are mixed together within an inert solvent thereby to prepare a catalyst in advance and then the thus prepared catalyst is added to the starting olefin.

6. A method according to claim 1, wherein a solvent or solvents of two kinds or more selected from the group consisting of n-pentane, iso-octane, trichloroethane and tetrafluoroethane is or are employed at the time of polymerization.

* * * * *